Nov. 18, 1969   H. J. SAMUEL   3,478,561
EXTRUSION

Filed Oct. 21, 1966   5 Sheets-Sheet 2

INVENTOR
H. J. Samuel
BY
ATTORNEY

Nov. 18, 1969  H. J. SAMUEL  3,478,561
EXTRUSION
Filed Oct. 21, 1966  5 Sheets-Sheet 3
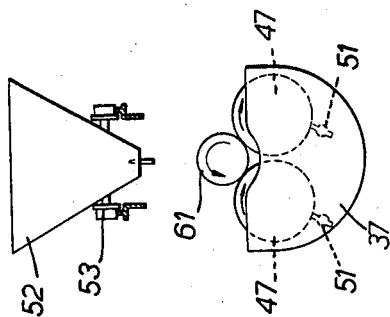
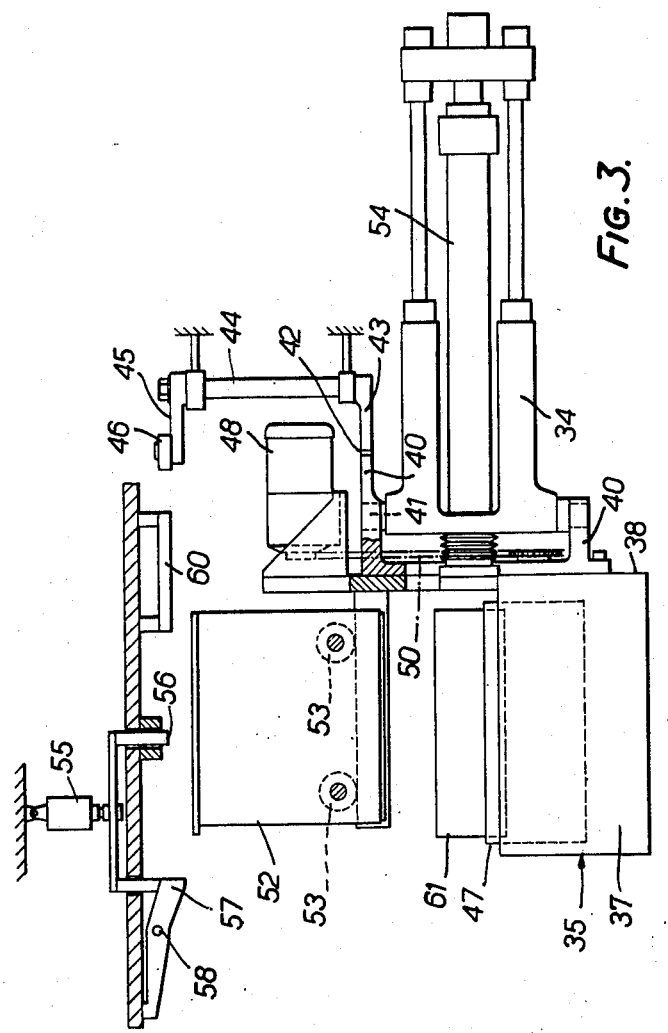
INVENTOR
*H. J. Samuel*
BY
*Holcomb, Wetherill & Brisbois*
ATTORNEY

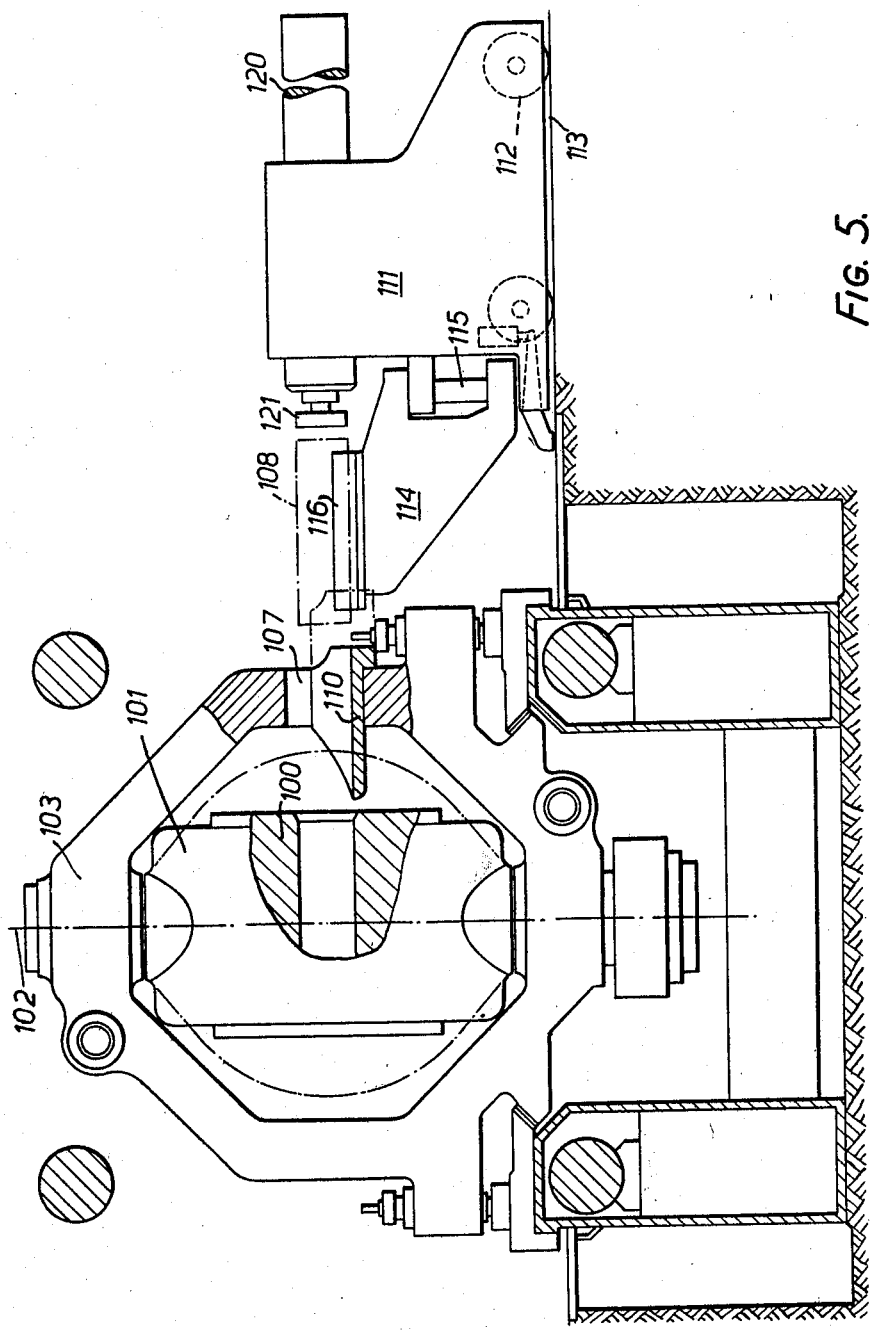

INVENTOR
H. J. Samuel
ATTORNEY

United States Patent Office 3,478,561
Patented Nov. 18, 1969

3,478,561
EXTRUSION
Herbert John Samuel, Dorset, England, assignor to Davy and United Engineering Company Limited, Sheffield, Yorkshire, England
Filed Oct. 21, 1966, Ser. No. 588,490
Claims priority, application Great Britain, Oct. 27, 1965, 45,484/65, 45,485/65
Int. Cl. B21c 23/00, 33/00
U.S. Cl. 72—270         11 Claims

ABSTRACT OF THE DISCLOSURE

An extrusion system for metals comprising an extrusion press having a pivotable container, at least one furnace for heating the metal billets preparatory to extrusion, a transfer device having a glassing unit for applying a lubricant to the surfaces of the billet and a billet loader for loading billets into the press container. The transfer device being movable between positions adjacent the or each furnace and the extrusion press.

---

This invention relates to the extrusion of metal particularly, but not exclusively, steel and copper. The invention is particularly concerned with that type of extrusion press having a container for receiving a billet to be extruded, the container being aligned with the extrusion ram and an extrusion die. The container holds the billet, which is extruded from the container and through the adjacent die by the extrusion ram.

Problems have been experienced in the loading of billets, preheated in a furnace, into the container. In one loading arrangement, a pivoted loading arm has been arranged in the press, to raise billets fed thereto from the furnace to a position aligned with the container and between the container and the retracted extrusion ram. When so aligned, the extrusion ram is used to force the billet into the container, prior to extrusion. This arrangement has the disadvantage that the loading mechanism, being inside the press, is vulnerable and is relatively inaccessible for servicing. In another previous arrangement, a loading arm is arranged outside the press and, in the retracted position, receives the billets from the furnace. The arm is extended to convey the billets into alignment with the container, when charging by the extrusion ram is effected as before. This latter arrangement has advantages over the prior mechanism arranged within the press, but entails, as before, the use of the extrusion ram for loading and obstructs access to the press.

Oxidation of the hot metal billets occurs during the transfer from the furnace to the press. This is a matter of concern, particularly in the case of carbon and alloy steel billets where scale formation may be detrimental in the extrusion process, both to the extrusion tools and to the finished product. Protection against oxidation of the billets is afforded by the known glass lubrication process, but normally the glassing station, at which the glass lubricant is applied to the billet is located adjacent to the press and, in most cases, distant from the furnace. There is a danger, therefore, that detrimental oxidation of the billet surface may occur before glassing can be applied. Also, where there are a number of furnaces in use, the transit time from the furnace to glassing unit may vary from furnace to furnace, with the result that the amount of oxidation to which a billet is subjected may vary according to the furnace from which the billet is derived.

In accordance with a first aspect of the present invention, an extrusion system for metals comprises an extrusion press, two or more furnaces for heating the metal billets preparatory to extrusion, and a glassing unit for applying lubricant to the surfaces of the billet, which glassing unit is movable to positions adjacent to each of the furnaces. By the use of such a movable glassing unit, it is ensured that each billet is protected by glassing immediately on extraction from the furnace, the exposure time to oxidation for each billet is kept at a minimum value, and that exposure time is approximately the same regardless of which of the furnaces supplies the billet.

In accordance with a second aspect of the present invention, an extrusion system comprises an extrusion press, which includes a billet container, which receives the billets and from which the metal is extruded through an adjacent die, and which is pivotable about an axis normal to the container axis between an extrusion position and a billet loading position; at least one furnace for heating the billets preparatory to extrusion, a billet transfer device, movable between the furnace and the press and arranged to receive billets directly from the furnace and to transfer them directly to the container when the latter is inclined to the extrusion axis; a glassing unit for applying glass lubricant to the billets, which glassing unit is carried by the transfer device; and loading means also carried by the transfer device for urging the billets off the transfer device and into the container.

The invention also includes a method of extruding metal, which comprises heating a billet in a furnace, transferring the heated billets from the furnace to a transfer device, applying a glass lubricant to the billet, while on the transfer device and immediately after removal from the furnace, transferring the billet on the transfer device to a point immediately adjacent the extrusion press, inclining the extrusion press container to the extrusion axis, loading the billet from the transfer device into the container, when the latter is so inclined, removing the transfer device, turning the container so that its axis is aligned with the extrusion axis, and extruding the billet from the container through a die.

The invention will be more readily understood by way of example from the following description of extrusion systems in accordance therewith, reference being made to the accompanying drawing, in which:

FIGURE 3 is a section on the line III—III of FIGURE 1, FIGURE 4 is an end view of the glassing unit of FIGURE 3, FIGURE 5 is a view of an alternative press, partly in section, in the direction of the extrusion axis.

Figure 1:
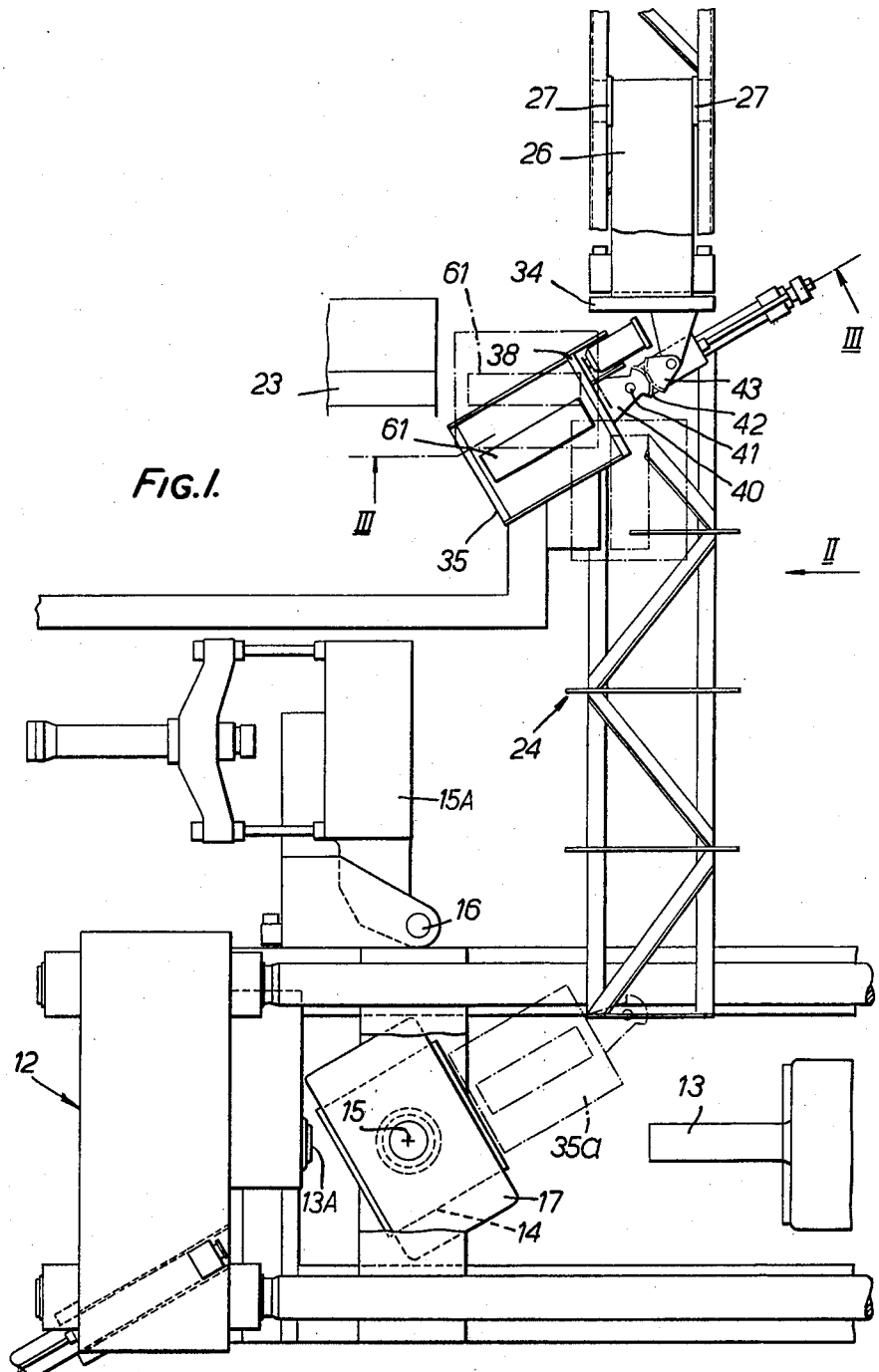
FIGURE 1 is a plan view of the press and auxiliary equipment.
Figure 2:
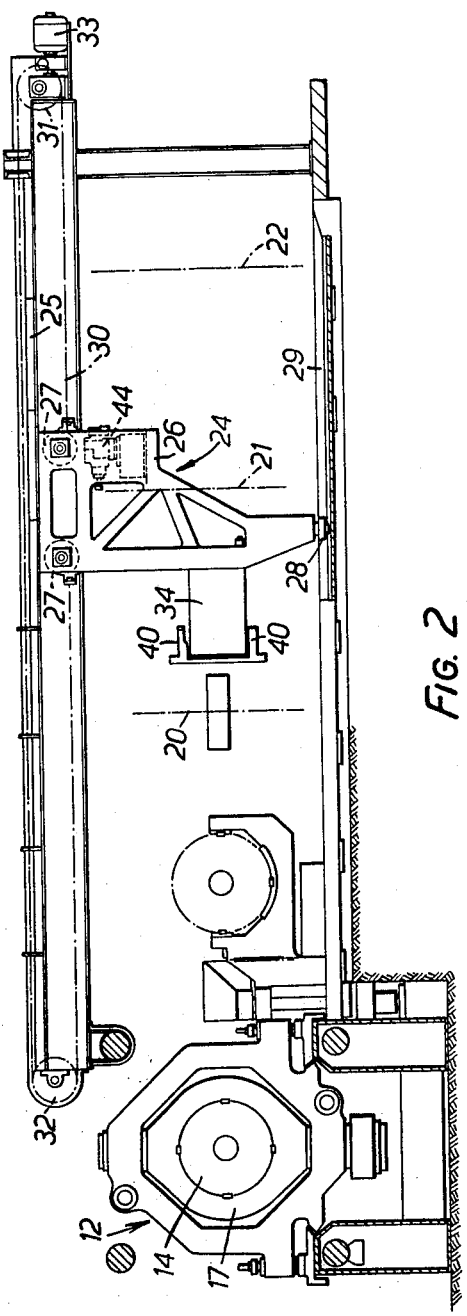
FIGURE 2 is a side view of the equipment of FIGURE 1, as seen in the direction of the arrow II.

The press, indicated generally at 12 in FIGURES 1 and 2 is as described in co-pending U.S. application Ser. No. 577,512, including a main extrusion ram indicated at 13, a die at 13A, a container at 14 and a container holder at 17. This container holder 17 can be pivoted about a vertical axis 15 between a position in which its axis is aligned with the extrusion axis and a loading position, as shown in FIGURE 1, in which it is inclined to the extrusion axis. A container changer 15A is rotatable about a vertical axis 16 for the removal and supply of containers 14 to the container holder 17.

Associated with the press 12 are a number of furnaces for preheating the billets, prior to extrusion. These furnaces are not shown in the drawings, but they are of conventional form and the centre lines of three furnaces are indicated in FIGURE 2 at 20, 21 and 22. The billet feed line from one of the furnaces is also indicated at 23 in FIGURE 1. A transfer device 24 for transferring billets from any of the furnaces to the press is arranged at right angles to the press axis, so as to pass adjacent the billet feed lines of the furnaces and to terminate at the side of the press. This transfer device comprises an overhead trackway 25 on which a carriage 26 runs by means of wheels 27. As shown, the carriage 26 projects downwardly from the trackway 25 and carries a guide wheel 28 at the lower end, running between rails 29 at floor level. The carriage is secured to a cable 30 which passes around pulley wheels 31, 32 at the ends of the trackway 25 and which is driven by a motor 33 to cause the carriage 26 to move lengthwise along the trackway.

The carriage 26 carries beneath the trackway 25, an arm 34 which projects from the carriage 26 in the direction of the length of the trackway 25 and towards the extrusion press 12. This arm 34 in turn pivotally carries a glassing unit 35.

As best shown in FIGURE 3, glassing unit 35 consists of a semi-cylindrical container 37 carried on a vertical plate 38. The plate 38 is supported on a pair of brackets 40, which are pivoted to the arm 34 by a vertical pivot pin 41. The end of the upper bracket 40 distant from the plate 38 is formed as a segment gear 42 which meshes with a segment gear 43 coupled through shaft 44 to an actuating arm 45 carrying a cam roller 46. Within the container 37 are mounted a pair of horizontal rollers 47 at least one of which is driven by a motor 48 through a chain 50. Each roller 47 has a scraper 51 for removing from the surfaces extraneous material. Also carried by the vertical plate 38 is a hopper 52 carried on wheels 53 on a track extending parallel to and above the axis of the rollers 47. This hopper is designed to carry the glassing composition. Lastly, an ejector ram 54 supported by plate 38 is arranged, when operated, to cause an ejector stem to pass through the plate 38 and to move parallel to, but slightly above the rollers 47.

At each furnace location an operating cylinder 55 carries a striker pin 56 and a stop 57, the latter being horizontally pivoted at 58. Normally the pin 56 and stop 57 are retracted by cylinder 55 out of the path of cam roller 46. However, when a billet is to be delivered from a furnace to the glassing unit, the cylinder 55 is operated to lower the pin and stop into that path. Each furnace has also a cam plate 60, the function of which will become apparent subsequently.

The equipment operates as follows: when a fresh billet is to be supplied to the press, the carriage 26 is moved by the motor 33 towards the appropriate furnace i.e. from right to left in FIGURE 3. During this movement the glassing unit is in the inclined position of FIGURE 1. In this position the cam roller 46 by-passes the cam plate 60 (FIGURE 3) associated with the furnace and strikes the lower pin 56 which rotates the arm 45 anti-clockwise in FIGURE 1 and causes the glassing unit to turn clockwise to take a position with the axis of the rollers 47 parallel with the feedline and the extrusion axis. When, on further movement of the carriage 26, the stop 57 is engaged, the carriage is automatically brought to rest at the correct registration. The billet is fed onto the rollers 47 from the furnace, so as to take up the position indicated at 61 in FIGURE 4 and the motor 48 actuated. The billet 61 is rotated by the rollers 47 and immediately glass lubricant is deposited onto the surface of the billet 61 from the hopper 52. The glassing unit 35 is now moved back toward the press, and in so doing, the cam roller 46 engages the cam plate 60 which causes the arm 45 to rotate clockwise (FIGURE 1) with the result that the unit 35 is turned anti-clockwise (FIGURE 1) about the pivot pin 41 and takes up the inclined position shown in FIGURE 1; at the same time, the container holder 17 of the press is turned about its axis 15 to a similar inclined position in which its axis is parallel to the axis of the billet supported by the glassing unit. The carriage 26 is brought to rest at the extremity of the trackway 25 adjacent the press 12, so that the glassing unit 35 takes up the position 35a shown in FIGURE 1. When the glassing unit reaches this position, the rotation of the rollers 47 is stopped and the ram 54 is operated to push the billet 61 off the rollers 47 and into the container 14. Lastly, the carriage 26 is removed from the press, the container holder 17 is turned back into alignment with the extrusion axis and extrusion cam commence.

It will be appreciated that, by the use of the mobile glassing unit 35, glassing of a billet can be effected immediately on ejection from a furnace, regardless of which furnace is used. Thus, the oxidation time is reduced to a minimum. It will also be appreciated that the down time of the press, due to the introduction of a new billet, is kept to a minimum, since the loading mechanism is self contained on the carriage 26 and the main extrusion ram 13 is not required to cause loading.

While the furnaces have been shown arranged parallel to the extrusion axis, they may be arranged at any other convenient angle, the pin 56 being so arranged in relation to the actuating arm 45 that the glassing unit is automatically aligned correctly for reception of the billet.

Figure 6:
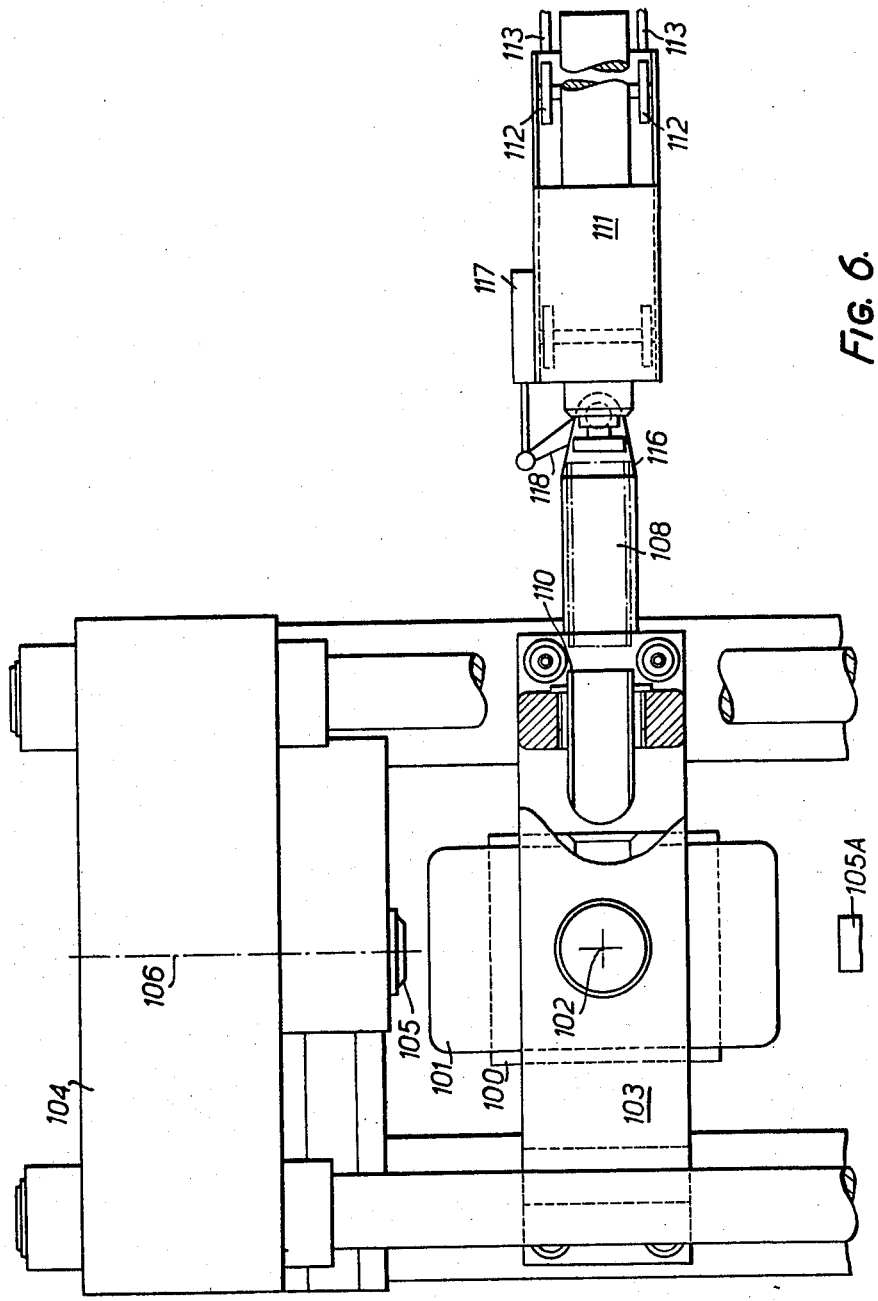
FIGURE 6 is a plan view of the press of FIGURE 5.

The press illustrated in FIGURES 5 and 6 is generally similar to that described; the container 100 is removably mounted in a container holder 101 which, in turn, is mounted for rotation about a vertical axis 102 in a yoke 103, disposed in the press 104 between the extrusion die 105 and the extrusion ram indicated at 105A. The extrusion axis is indicated at 106, and, as will be seen in FIGURE 2, the yoke 103 is disposed at right angles to the extrusion axis 106. The container holder 101 is rotated by a motor, which is not shown in the figures, and has locking pieces to lock the holder with the axis of the container aligned with the extrusion axis 106.

For loading the container 100, an opening 107 is formed in the yoke 103, the opening being large enough to receive a billet, one of which is indicated in chain line at 108. A removable slide tray 110 is received in the opening 107. Billets are transferred from a furnace (not shown) to the press by means of a loading carriage 111, which is mounted on wheels 112 running on a track 113 extending at right angles to the extrusion axis 106. The carriage 111 carries an arm 114 which is pivoted or a vertical pin 115 to the carriage 111. The arm 114 in turn carries a billet receiving tray 116 at the same level as the slide tray 110. The arm 114 can be rotated about the pin 115 by a hydraulic cylinder 117, through a link arm 118. The carriage 111 also has a pusher ram 120, the piston of which carries a pusher 121 adjacent a billet 108 carried on the tray 16.

To load the press with a billet, the carriage 111 is moved to the furnace and, if necessary, the arm 114 is rotated through a right angle to receive on the tray 116 the billet from the furnace. Then, the arm 114 is returned to the position shown in the drawings and the carriage 111 is traversed to the position shown adjacent the press. In the meantime, the container holder 101 is turned from the extrusion position in which the container axis is aligned with the extrusion axis 106, through 90° to the loading position shown in the drawings, with the container axis aligned with the opening 107; in this position, the tray 110 is at the same height as the bottom of the container opening.

The pusher cylinder 120 is then operated to push the billet 108 off the tray 116, over the tray 110 in the yoke 103 and into the container 100. When this has been effected, the pusher 121 is retracted, the carriage is removed away from the press, and the container holder 101 is turned back to the extrusion position and locked in that position. Extrusion can then commence.

I claim:
1. An extrusion system comprising an extrusion press, which includes a billet container to receive the billets and from which the metal is extruded through an adjacent die, and which is pivotable about an axis normal to the container axis between an extrusion position and a billet loading position, at least one furnace for heating the billets preparatory to extrusion, a billet transfer device movable between the furnace and the press and arranged to receive billets directly from the furnace and to transfer them directly to the container when the latter is inclined to the extrusion axis, a glassing unit for applying glass lubricant to the billets, which glassing unit is carried by the transfer device, and loading means also carried by the transfer device for urging the billets off the transfer device and into the container.

2. An extrusion system according to claim 1 in which the container is pivotable through 90° between its operative position and its billet loading position.

3. An extrusion system according to claim 2 in which the container is removably mounted in a holder which is pivotally mounted in a framework disposed at right-angles to the extrusion axis, and in which the framework includes an opening aligned with the container in its loading position.

4. An extrusion system according to claim 1 including a plurality of furnaces for heating the billets preparatory to extrusion, the billet transfer device being movable adjacent each furnace to receive a billet therefrom and transport it to the press.

5. An extrusion system according to claim 1 in which the transfer device is movable on a track extending normal to the extrusion axis.

6. An extrusion system according to claim 1 in which the transfer device includes a billet supporting part which together with the billet loader is rotatable relative to the track.

7. An extrusion system according to claim 6 including means for automatically aligning the billet supporting part of the transfer device with a furnace to receive a billet therefrom and automatically aligning the billets supporting part with the container in its loading position.

8. An extrusion system according to claim 1 in which the billet supporting part includes a pair of spaced aligned rollers and means for driving at least one of the rollers.

9. An extrusion system according to claim 1 in which the billet loader comprises a piston and cylinder assembly mounted on the transfer device.

10. An extrusion system for metals comprising an extrusion press, two or more furnaces for heating metal billets preparatory to extrusion, and a glassing unit for applying lubricant to the surfaces of the billet, which glassing unit is movable to positions adjacent each of the furnaces.

11. A method of extruding metal, which comprises heating a billet in a furnace, transferring the heated billet from the furnace to a transfer device, applying a glass lubricant to the billet, while on the transfer device and immediately after removal from the furnace, transferring the billet on the transfer device to a point immediately adjacent the extrusion press, inclining the extrusion press container to the extrusion axis, loading the billet from the transfer device into the container while the latter is so inclined, removing the transfer device, turning the container so that its axis is aligned with the extrusion axis and extruding the billet from the container through a die.

References Cited

UNITED STATES PATENTS

| | | | |
|---|---|---|---|
| 887,718 | 5/1908 | Benjamin | 72—272 X |
| 896,683 | 8/1908 | Benjamin | 72—263 |
| 927,076 | 7/1909 | Remmen | 72—263 |
| 3,120,304 | 2/1964 | Pahnke et al. | 72—272 X |
| 3,156,359 | 11/1964 | Elger et al. | 72—263 X |
| 3,182,479 | 5/1965 | Rosenthal | 72—263 |
| 3,359,770 | 12/1967 | Asari | 72—263 |
| 2,738,062 | 3/1956 | Edgecombe | 207—10.1 X |
| 3,097,742 | 7/1963 | Lamberty | 207—10.1 |

MILTON S. MEHR, Primary Examiner

U.S. Cl. X.R.

72—43, 263